US005743630A

United States Patent [19]
Yanagihara et al.

[11] Patent Number: 5,743,630
[45] Date of Patent: Apr. 28, 1998

[54] METHOD FOR MOLDING LAMP BODY AUTOMOTIVE LAMPS AND LAMP BODY THEREOF FORMED OF SYNTHETIC RESIN AND A MOLD THEREFOR

[75] Inventors: Hirokazu Yanagihara; Masakazu Yamashita, both of Shizuoka, Japan

[73] Assignee: Koito Manufacturing Co., Ltd., Tokyo, Japan

[21] Appl. No.: 591,742

[22] Filed: Jan. 25, 1996

[30] Foreign Application Priority Data

Jan. 31, 1995 [JP] Japan .................................. 7-032904

[51] Int. Cl.[6] .................................................. F21V 29/00
[52] U.S. Cl. ............................ 362/294; 362/61; 362/373
[58] Field of Search .......................... 362/61, 80, 96, 362/294, 345, 74, 373

[56] References Cited

U.S. PATENT DOCUMENTS

| | | | |
|---|---|---|---|
| 4,739,458 | 4/1988 | Yamayoshi et al. | 362/294 |
| 5,003,446 | 3/1991 | Nagengast et al. | 362/294 |
| 5,010,453 | 4/1991 | Ketterman | 362/61 |
| 5,095,410 | 3/1992 | Nagengast et al. | 362/61 |
| 5,367,438 | 11/1994 | Deslandres | 362/61 |
| 5,497,308 | 3/1996 | Ohtsuka et al. | 362/294 |
| 5,609,407 | 3/1997 | Yanagihara et al. | 362/61 |

*Primary Examiner*—Alan Cariaso
*Attorney, Agent, or Firm*—Sughrue, Mion, Zinn, Macpeak & Seas, PLLC

[57] ABSTRACT

A method for molding a lamp body of vehicular lamps formed of synthetic resin which includes steps of forming a lamp body by synthetic resin which is provided with an air communication hole, a surrounding wall formed at a position where the air communication hole is surrounded thereby, and a cover member for covering a rear portion of the air communication hole, forming a recess on one surface of the surrounding wall to provide a thin hinge section to form the cover member integrally with the lamp body, bending down the cover member at the recess while facing outside to thereby define a communication passage connecting to the air communication hole cooperatively with the surrounding wall, providing a mold core for molding the cover member to extend in the core sliding direction, which mold core is constituted by a first block positioning at the side of the cover member where the recess is formed and a second block positioning at the opposite side thereof, retracting first, when the lamp body is retracted from the mold after the injection-molding process, the second block positioning at the side of the cover member where the recess is not formed, and then retracting the first block positioning at the side of the cover member where the recess is formed while bending the cover member at the hinge section.

10 Claims, 8 Drawing Sheets

5,743,630

METHOD FOR MOLDING LAMP BODY AUTOMOTIVE LAMPS AND LAMP BODY THEREOF FORMED OF SYNTHETIC RESIN AND A MOLD THEREFOR

BACKGROUND OF THE INVENTION

1. Field of the Invention

The present invention relates to a novel method for molding lamp body automotive lamps and lamp body thereof formed of synthetic resin and a mold therefor. More specifically, the invention relates to a mold for forming a lamp body of the automotive lamp formed of a synthetic resin which is simple in structure particularly without necessitating a slide core.

2. Related Art

There has been known an automotive lamp in which a lamp chamber defined by a lamp body and a front lens coupled to a front opening of the lamp body is communicated with an atmosphere through an air communication hole formed in the lamp body, so that moisture is prevented from being collected by the front lens and a reflector and the moisture collected on the front lens and the reflector will be immediately dissipated.

FIGS. 8A and 8B are sectional views showing an essential part of the conventional vehicular lamp.

As shown in FIGS. 8A and 8B, a lamp body a formed of synthetic resin is formed at a rear wall thereof with an air communication hole b. The lamp body a is provided with a surrounding wall c projecting from a rear surface thereof for surrounding the upper, left and right positions of the air communication hole b. An upper part c' of the surrounding wall c is formed integrally with a cover member d continuously extending from a rear end of the upper part c'.

As shown in FIG. 8A, a hinge section e having a small thickness is formed at the junction of the upper part c' of the surrounding wall c and the cover member d so that the cover member d extends rearwardly. The thin hinge section e is formed by making a recess f at a predetermined portion of the upper part c' of the surrounding wall c.

As shown in FIG. 8B, the cover member d is bent down at the thin hinge section e to cover the rear part of the surrounding wall c to thereby define a communication passage g connecting to the air communication hole b.

In order to injection-molding the lamp body a as described above by synthetic resin, a mold core slides in the directions along arrows A and B shown in FIG. 8A. In this case, however, because the recess f is formed to provide the thin hinge section e which connects the cover member d to the upper part c' of the surrounding wall c as shown in FIG. 8A, the other mold core for forming the cover member d cannot slide in the direction along the arrow B. For this reason, slide core, angular pin, pocket hole or the like must be required for molding the conventional vehicular lamp, which make the structure of the mold complicated.

SUMMARY OF THE INVENTION

The present invention was made in view of the foregoing problems accompanying the method and mold for molding the conventional vehicular lamp. Accordingly, an object of the present invention is to provide a method for molding lamp body automotive lamps and lamp body thereof formed of synthetic resin and a mold therefor.

The above and other objects can be accomplished by a method for molding a lamp body of vehicular lamps formed of synthetic resin which, according to the present invention, includes steps of forming a lamp body by synthetic resin which is provided with an air communication hole, a surrounding wall formed at a position where the air communication hole is surrounded thereby, and a cover member for covering a rear portion of the air communication hole, forming a recess on one surface of the surrounding wall to provide a thin hinge section to form the cover member integrally with the lamp body, bending down the cover member at the recess while facing outside to thereby define a communication passage connecting to the air communication hole cooperatively with the surrounding wall, providing a mold core for molding the cover member to extend in the core sliding direction, which mold core is constituted by a first block positioning at the side of the cover member where the recess is formed and a second block positioning at the opposite side thereof, retracting first, when the lamp body is retracted from the mold after the injection-molding process, the second block positioning at the side of the cover member where the recess is not formed, and then retracting the first block positioning at the side of the cover member where the recess is formed while bending the cover member at the hinge section.

Further, a mold for molding a lamp body of vehicular lamps formed of synthetic resin according to the present invention includes a lamp body formed by synthetic resin which is provided with an air communication hole, a surrounding wall formed at a position where the air communication hole is surrounded thereby, and a cover member for covering a rear portion of the air communication hole, a recess formed on one surface of the surrounding wall to provide a thin hinge section to form the cover member integrally with the lamp body, the cover member being bent down at the recess while facing outside to thereby define a communication passage connecting to the air communication hole cooperatively with the surrounding wall, and a mold core for molding the cover member to extend in the core sliding direction, which mold core is constituted by a first block positioning at the side of the cover member where the recess is formed and a second block positioning at the opposite side thereof, the first block is slidable with respect to a mold main core whereas the second block is stationary with respect thereto.

Furthermore, a vehicular lamp according to the present invention includes a lamp body formed by synthetic resin, which is provided with an air communication hole, a surrounding wall formed at a position where the air communication hole is surrounded thereby, a cover member for covering a rear portion of the air communication hole, a recess formed on one surface of the surrounding wall to provide a thin hinge section to form the cover member integrally with the lamp body, wherein the cover member is bent down at the recess while facing outside to thereby define a communication passage connecting to the air communication hole cooperatively with the surrounding wall.

According to the present invention, the lamp body of the vehicular lamp formed of synthetic resin can be molded by a mold without requiring slide core, angular pin, pocket hole or the like. Therefore, the lamp body formed of synthetic resin can be manufactured not costly with the simple mold.

DESCRIPTION OF THE PREFERRED EMBODIMENTS

The present invention will be described hereinbelow in detail with reference to accompanying drawings.

Figure 1:
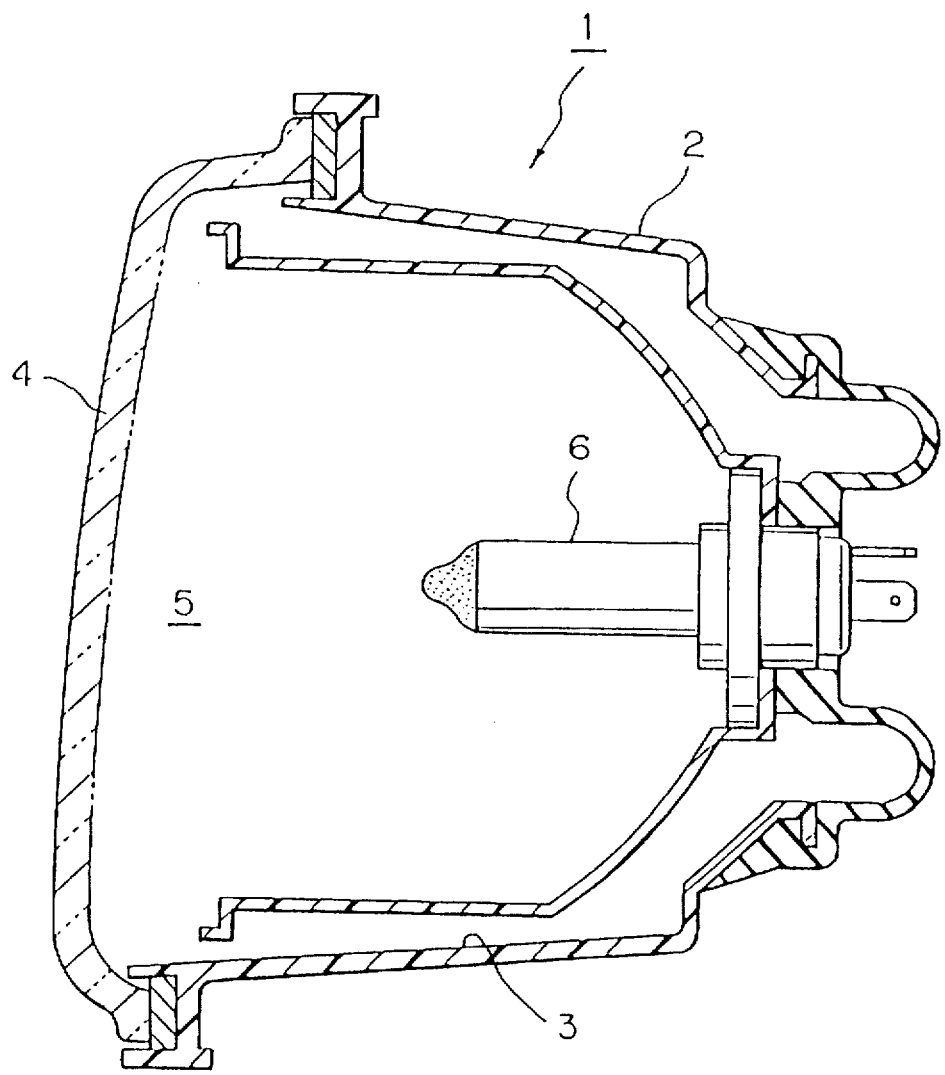
FIG. 1 is a vertical sectional view of an automotive lamp according to one embodiment of the invention.
Figure 2:
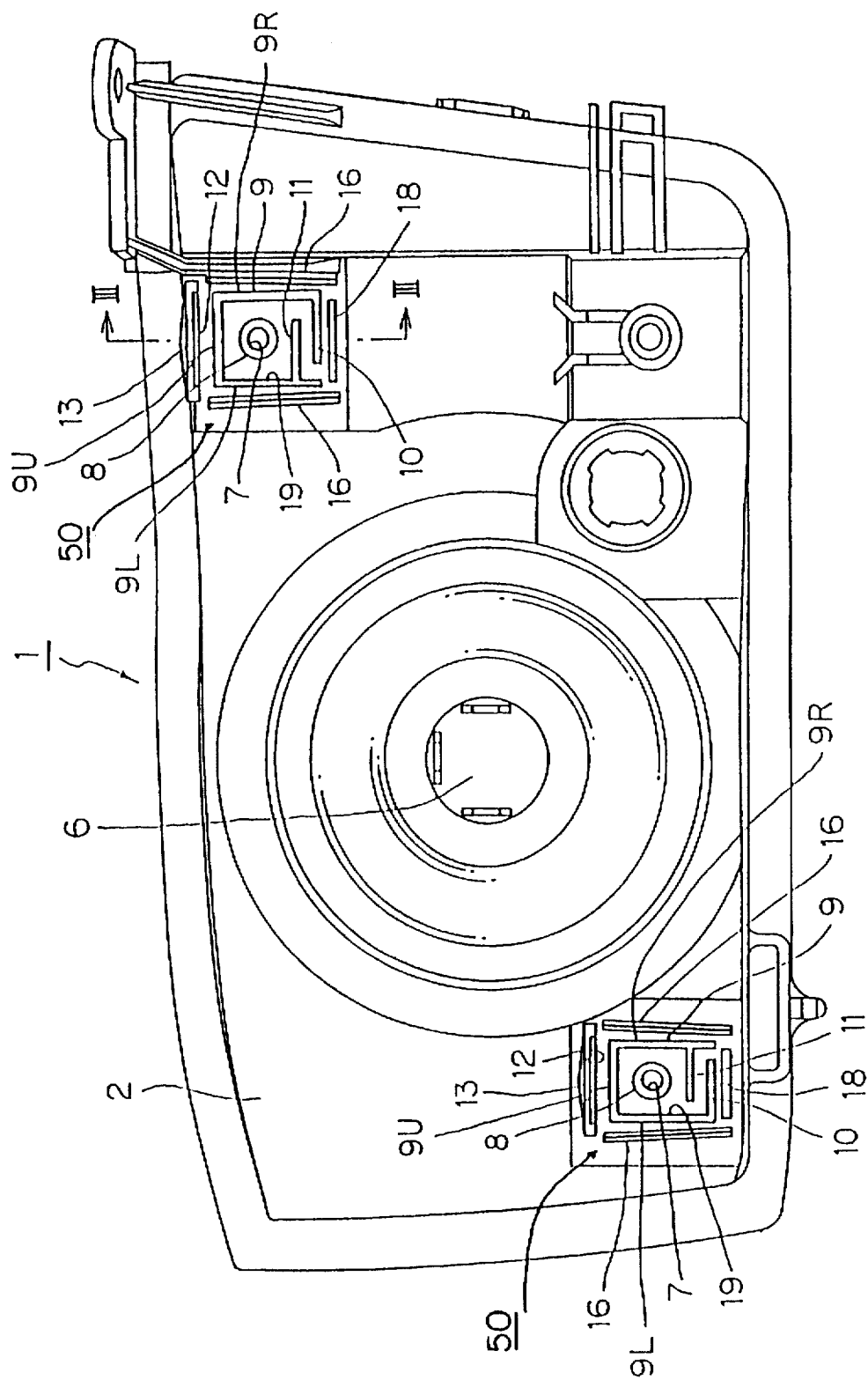
FIG. 2 is a rear view of the automotive lamp shown in FIG. 1 with cover member opening.

With respect first to the automotive lamp, as shown in FIGS. 1 and 2, an automotive lamp 1 is provided with a lamp body 2, formed of synthetic resin, having a front opening 3, a front lens 4 is coupled to the front opening 3 of the lamp body 2 to thereby define a lamp chamber 5, and a light source bulb 6 is mounted within the lamp chamber 5.

Figure 3:
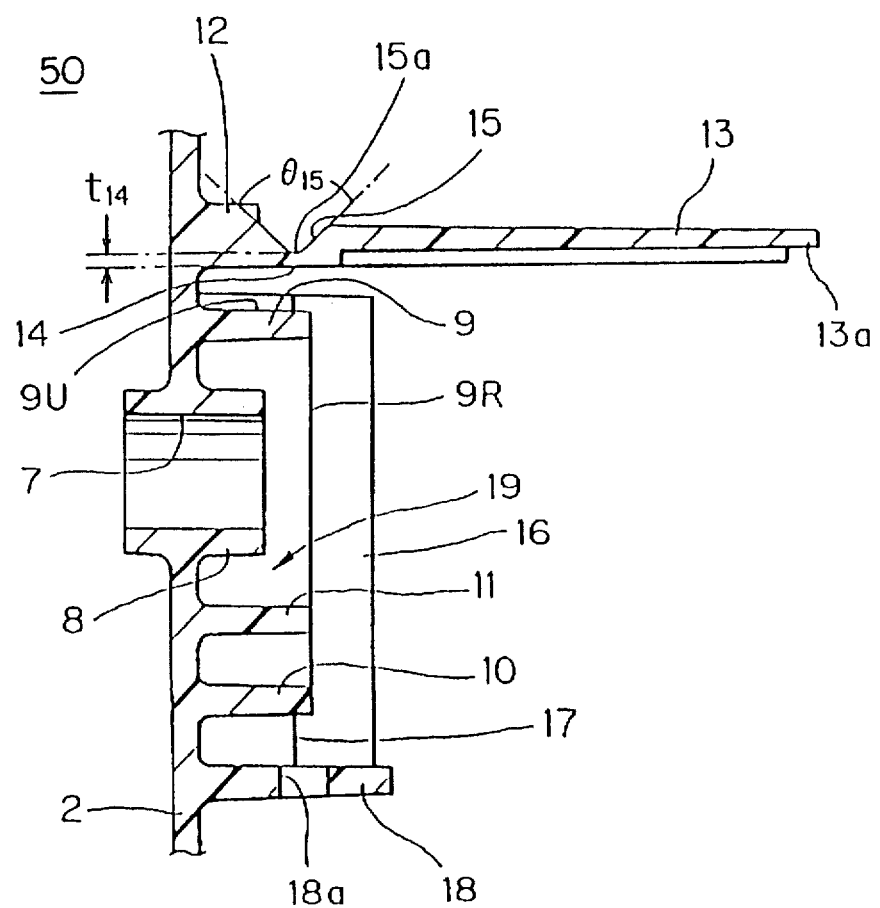
FIG. 3 is a sectional view of an air communication system cut along a line III—III in FIG. 2.

As shown in FIGS. 2 and 3, air communication systems 50 are provided at a rear portion of the lamp body with an air communication hole 7, a surrounding wall 9, a first water blocking wall 10, a second water blocking wall 11, and a pent roof wall 12.

In the upper air communication system 50, the air communication hole 7 is Formed in a rear wall of the lamp body 2, and a cylinder member 8 extends rearwardly from and integrally with an opening periphery of the air communication hole 7. The surrounding wall 9 projects from a rear wall of the lamp body 2 for surrounding the cylinder member 8 with a certain distance therefrom. The projecting length of the surrounding wall 9 is slightly longer than that of the cylinder member 8. The first water blocking wall 10 projects leftward from a lower distal end of a right side wall 9R of the surrounding wall 9. The left end of the first water blocking wall 10 does not reach a left side wall 9L of the surrounding wall 9. The second water blocking wall 11 projects rightward from the left side wall 9L of the surrounding wall 9 at a position slightly upper than the lower distal end of the left side wall 9L. A right distal end of the second water blocking wall 11 does not reach the right side wall 9R of the surrounding wall 9. The first and second water blocking walls 10 and 11 are vertically spaced apart from each other, and the projecting length of each of the water blocking walls 10 and 11 is substantially the same as that of the surrounding wall 9. The pent roof wall 12 extends in the horizontal direction at a position slightly upper than the surrounding wall 9. The projecting length of the pent roof wall 12 is substantially the same as that of the surrounding wall 9.

A cover member 13 is formed integrally with the pent roof wall 12 continuously therefrom through a thin hinge section 14. The cover member 13 is provided at a tip end thereof with an engaging protrusion 13a. The thin hinge section 14 is formed on a surface of a junction of the pent roof wall 12 and the cover member 13 opposite the surrounding wall 9 by forming a recess 15 which is V-shaped in cross section. According to the embodiment, as shown in FIG. 3, an angle $\theta_{15}$ of the V-shaped recess 15 is approximately 90°. On the other hand, a bottom 15a of the recess 15 has a curved surface, and a thickness $t_{14}$ of the thin hinge section 14 is within a range of 0.3 to 0.7 mm. These dimensions are determined in consideration of the moldivity during the injection-molding of the lamp body 2 and the mechanical strength of the thin hinge section 14 as a hinge. The purpose of the curved surface at the bottom 15a of the recess 15 is to accomplish a smooth flow of fusion resin during the molding.

A couple of outside walls 16, 16 are formed on the rear wall of the lamp body 2 to extend in the vertical direction and spaced apart laterally from the surrounding wall 9. The projection length of the outside walls 16 from the rear wall of the lamp body 2 is slightly longer than that of the surrounding wall 9. Step parts 17, 17 facing rearward are formed at a rear end of the respective outside walls 16, 16 on surfaces thereof facing each other. The step parts 17, 17 position on substantially the same plane as the rear end of the surrounding wall 9.

A stopper wall 18 extends in the horizontal direction at a position slightly lower than the first water blocking wall 10. The stopper wall 18 is formed with an engaging slit 18a at a rear portion thereof.

The cover member 13 thus formed is bent down at the thin hinge section 14 facing the recess 15 outside, and the engaging protrusion 13a of the cover member 13 engages with the engaging slit 18a of the stopper wall 18. In this condition, the cover member 13 is maintained in such a manner that the left and right side edges of the cover member 13 come into contact to the step parts 17, 17 of the outside walls 16, 16 whereas the surface facing frontward comes into abutment against the surrounding wall 9 and the rear end of the first and second water blocking walls 10, 11.

The rear portion of the cylinder member 8 is then closed so that a maze air communication passage 19 communicating with the cylinder member 8 and having an opening which opens downward is defined by the outer surface of the cylinder member 8, the surrounding wall 9, the first and second water blocking walls 10, 11 and the cover member 13. The lamp chamber 5 communicates with the atmosphere through the air communication hole 7, the cylinder member 8 and the air communication passage 19. Owing to the structure of the air communication system, even if rain drops or the like fall on the lamp body 2, water is blocked by the first and second water blocking walls 10 and, therefore, prevented from entering the lamp chamber 5.

Next, the molding method of the lamp body 2 thus provided will now be described hereinbelow with reference to FIGS. 4 through 7, particularly with respect to the peripheral structure of the cover member 13 thereof.

A mold includes a stationary mold core 20 and a movable mold core 21. The movable mold core 21 slides into contact with the stationary mold core 20 to define a cavity 22 for molding the lamp body 2.

The movable mold core 21 is secured to a mounting plate 23 through supporting pins 24, 24, and the mounting plate 23 is driven by a not shown driving mechanism to slide the movable mold core into contact with and remove from the stationary mold core 20.

A projecting plate 25 is slidably supported on the supporting pins 24, 24 and also so supported by a projecting plate holding plate 26 which is also slidably supported by the supporting pins 24, 24. The projecting plate holding plate 26 slides in the same direction as the sliding direction of the movable mold core 21 by a thrust cylinder 27.

Projection pins 28, 28 (only one pin is shown in the figures) are supported by the projecting plate 25 and slidably penetrate the movable mold core 21.

A slide core 29 penetrates through a sliding hole 30 formed in the movable mold core 21 to be slidable therewith. The slide core 29 is formed, on a surface close to the cavity 22, with a protrusion 31 for making the recess 15 to form the thin hinge section 14. A base part of the slide core 29 is slidably inserted in a through hole 32 formed in the projecting plate 25, and a large diameter part 33 of the slide core 29 is slidably fitted in a housing hole 34 formed in the projecting plate holding plate 26. The slide core 29 is also provided with a shoulder section 35 at a position close to the rear surface of the movable mold core 21.

A compression coil spring 36 is compressed by the rear surface of the large diameter part 33 of the slide core 29 and the mounting plate 23. Owing to the compression coil spring 36, the front surface of the large diameter part 33 of the slide core 29 is usually urged against the rear opening periphery of the through hole 32 of the projecting plate 25.

Figure 4:
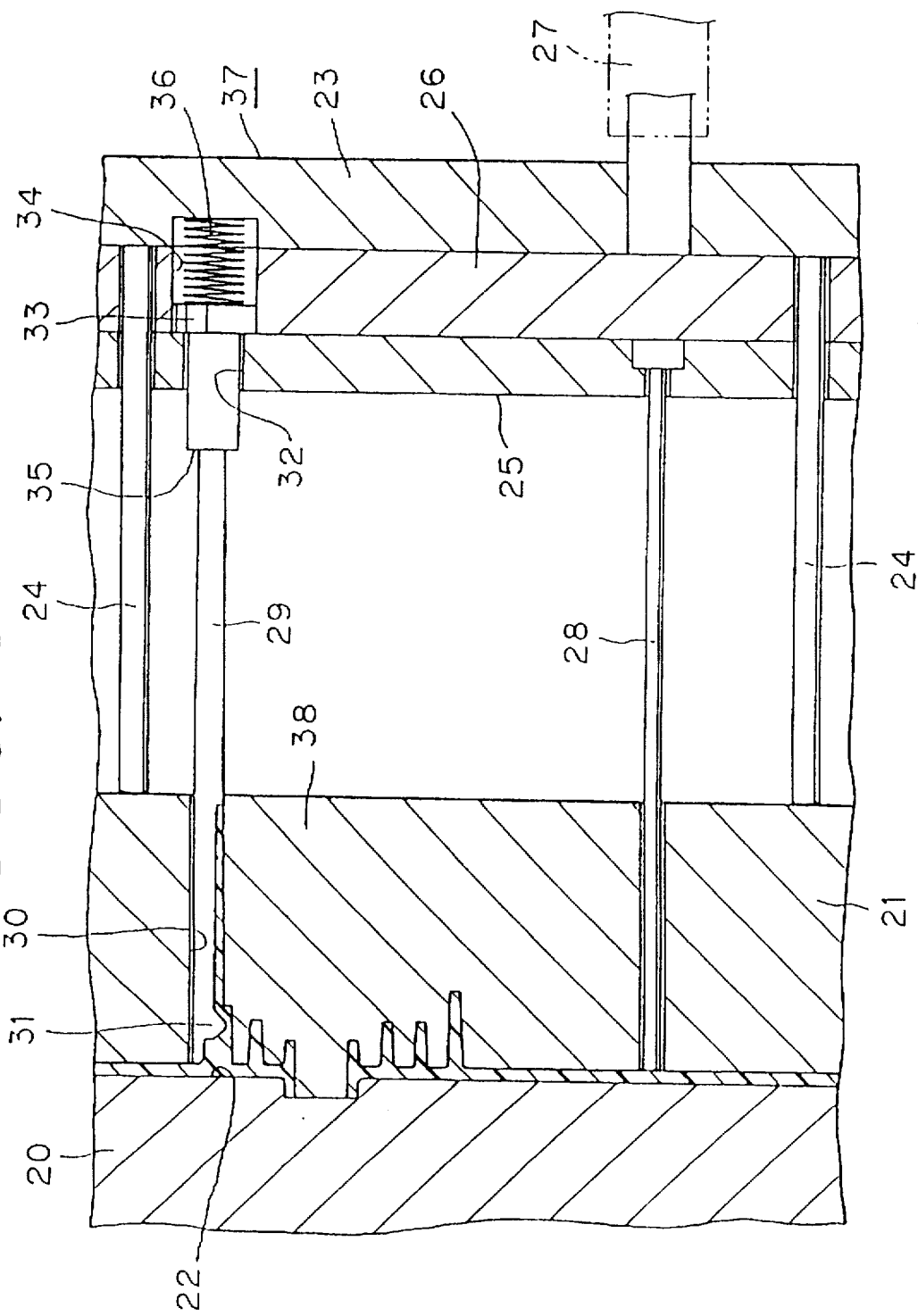
FIG. 4 is a sectional view of a mold in a status just after injecting fusion resin in the mold, which is one step of the molding method according to the invention.

As shown in FIG. 4, under a condition where the movable mold core 21 closely contact to the stationary mold core 20, fusion resin is injected into the cavity 22 to mold the lamp body 2.

Figure 5:
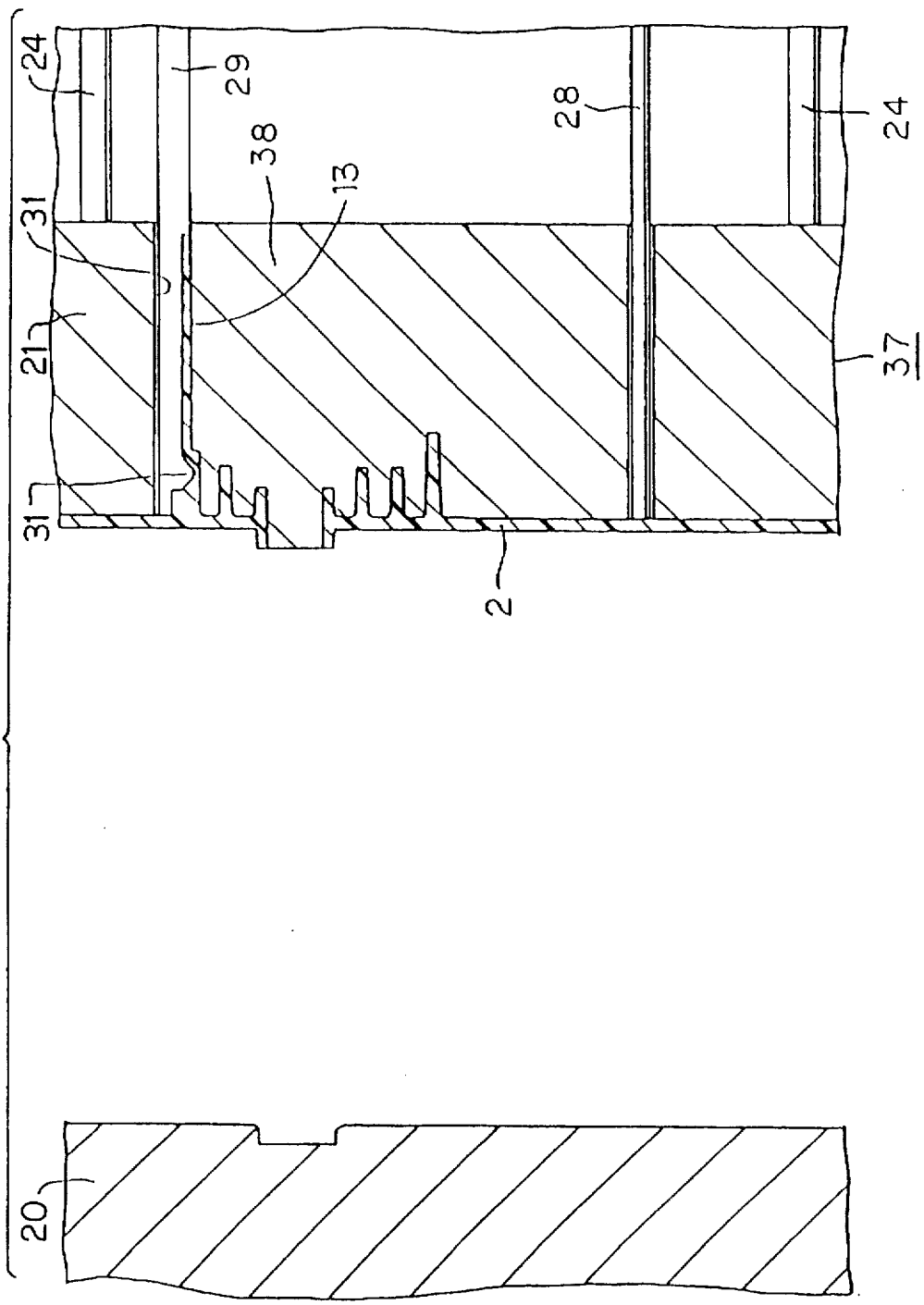
FIG. 5 is a sectional view of the mold according to another molding step of the invention where a movable mold block is removed from a stationary mold.

After cooling and solidifying the resin, as shown in FIG. 5, an entire movable block 37 including the movable mold core 21 retracts from the stationary mold core 20 by the drive mechanism (not shown).

Figure 6:
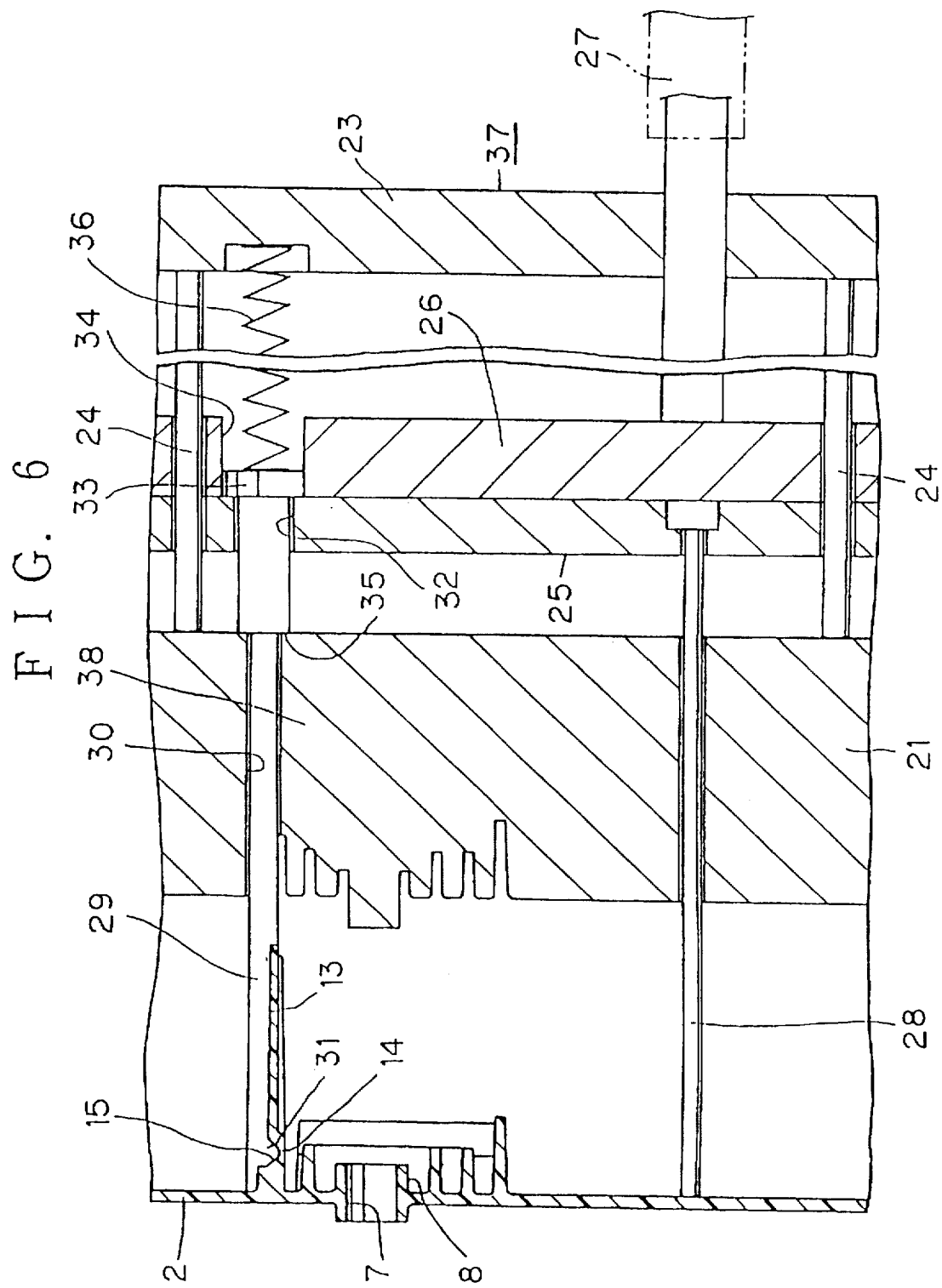
FIG. 6 is a sectional view of the mold according to the other molding step of the invention where a projection pin protrudes in the mold.

Thereafter, as shown in FIG. 6, the thrust cylinder 27 is operated to thrust the projecting plate 25 and the projecting plate holding plate 26 with respect to the mounting plate 23. With the operation, the front distal ends of the projection pins 28, 28 project frontward from the movable mold core 21 so that the molded lamp body 2 is detached from the movable mold core 21. In this operation, since the slide core 29 is in a condition where the protrusion 31 engages with the recess 15 of the lamp body 2, the slide core 29 relatively moves together with the lamp body 2 with respect to the movable mold core 21.

Afterwards, when the cover member 13 relatively slides far from the movable mold core 21 and completely spaced apart from a part 38 of the movable mold core 21 positioning opposite side of the slide core 29, the shoulder 35 of the slide core 29 comes into abutment against the rear opening periphery of the sliding hole 30 of the movable mold core 21, so that the slide core 29 is prevented from further moving frontwardly as shown in FIG. 6.

Figure 7:
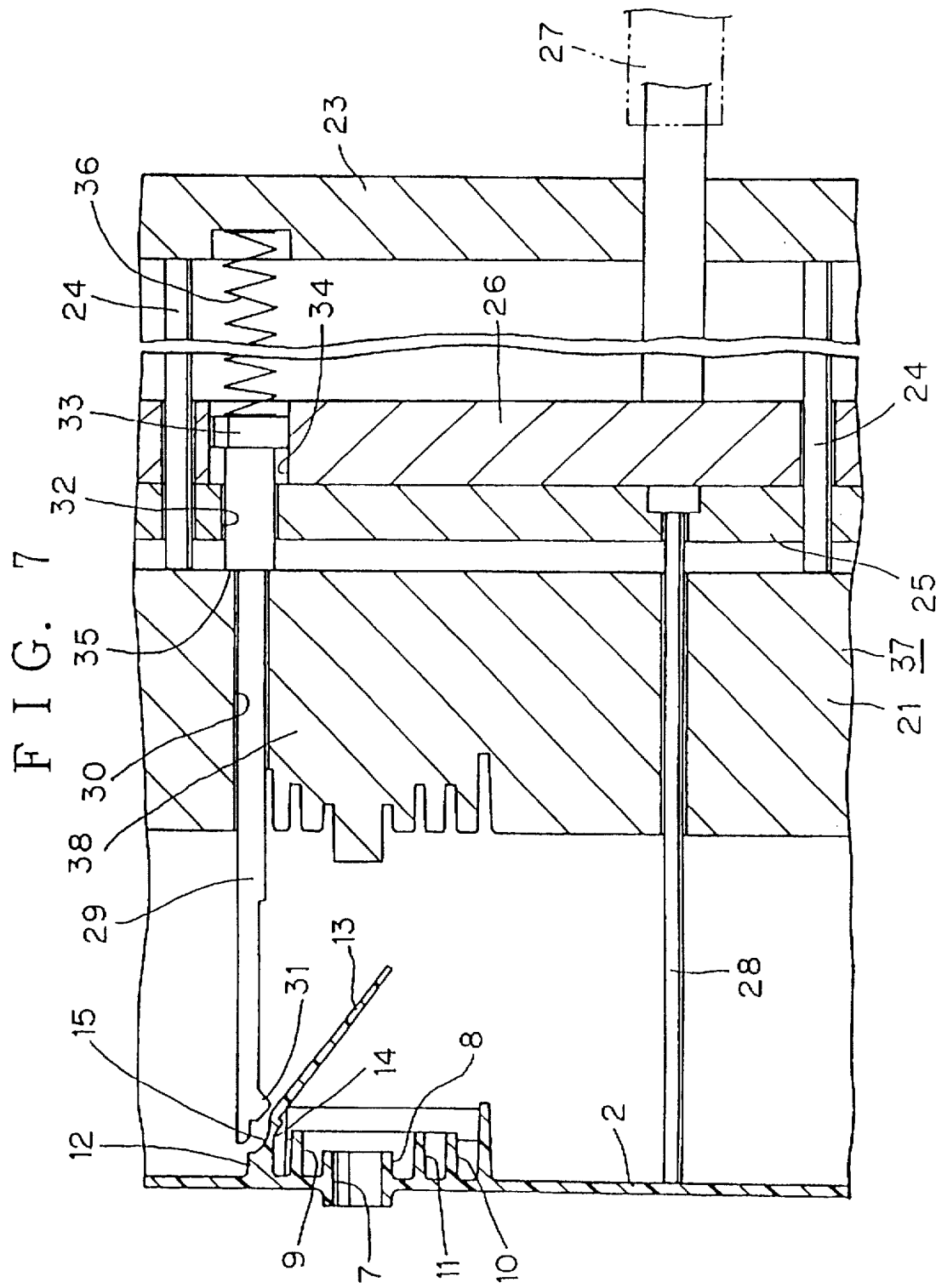
FIG. 7 is a sectional view of the mold according to the other molding step of the invention where the projection pin further protrudes in the mold.
Figure 8A:
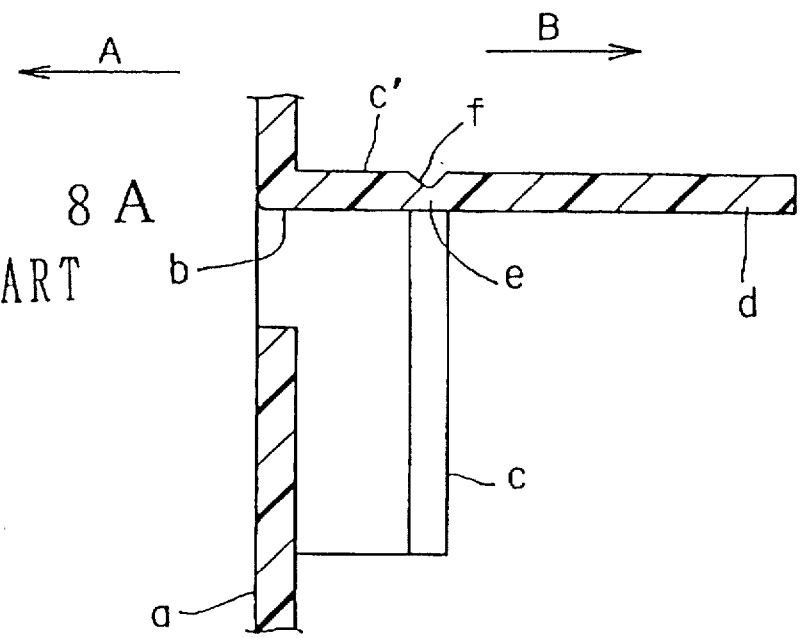
FIGS. 8A and 8B are sectional views showing an essential part of the conventional vehicular lamp.
Figure 8B:
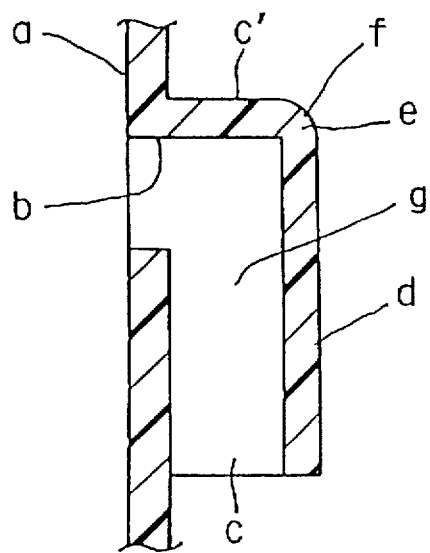

In the above operation, then the projection pins 28, 28 are operated to project so that the lamp body 2 detaches from the slide core 29. In this operation, since the part 38 of the movable mold core 21 is spaced apart from the cover member 13 the cover member 13 is detaching from the slide core 29 while bending down as shown in FIG. 7, so that the protrusion 31 disengages from the recess 15 of the lamp body 2.

With using the mold and molding method as described above, there is no necessity of a slide core which does not slide along relative sliding direction of stationary mold core and movable mold core. Therefore, a so called undercut part can be molded even at complicated and narrow portions.

As described above, according to the present invention, a method for molding a lamp body of vehicular lamps formed of synthetic resin includes steps of forming a lamp body by synthetic resin which is provided with an air communication hole, a surrounding wall formed at a position where the air communication hole is surrounded thereby, and a cover member for covering a rear portion of the air communication hole, forming a recess on one surface of the surrounding wall to provide a thin hinge section to form the cover member integrally with the lamp body, bending down the cover member at the recess while facing outside to thereby define a communication passage connecting to the air communication hole cooperatively with the surrounding wall, providing a mold core for molding the cover member to extend in the core sliding direction, which mold core is constituted by a first block positioning at the side of the cover member where the recess is formed and a second block positioning at the opposite side thereof, retracting first, when the lamp body is retracted from the mold after the injection-molding process, the second block positioning at the side of the cover member where the recess is not formed, and then retracting the first block positioning at the side of the cover member where the recess is formed while bending the cover member at the hinge section.

Further, a mold for molding a lamp body of vehicular lamps formed of synthetic resin according to the present invention includes a lamp body formed by synthetic resin which is provided with an air communication hole, a surrounding wall formed at a position where the air communication hole is surrounded thereby, and a cover member for covering a rear portion of the air communication hole, a recess formed on one surface of the surrounding wall to provide a thin hinge section to form the cover member integrally with the lamp body, the cover member being bent down at the recess while facing outside to thereby define a communication passage connecting to the air communication hole cooperatively with the surrounding wall, and a mold core for molding the cover member to extend in the core sliding direction, which mold core is constituted by a first block positioning at the side of the cover member where the recess is formed and a second block positioning at the opposite side thereof, the first block is slidable with respect to a mold main core whereas the second block is stationary with respect thereto.

Furthermore, a vehicular lamp according to the present invention includes a lamp body formed by synthetic resin, which is provided with an air communication hole, a surrounding wall formed at a position where the air communication hole is surrounded thereby, a cover member for covering a rear portion of the air communication hole, a recess formed on one surface of the surrounding wall to provide a thin hinge section to form the cover member integrally with the lamp body, wherein the cover member is bent down at the recess while facing outside to thereby define a communication passage connecting to the air communication hole cooperatively with the surrounding wall.

According to the present invention, the lamp body of the vehicular lamp formed of synthetic resin can be molded by a mold without requiring slide core, angular pin, pocket hole or the like. Therefore, the lamp body formed of synthetic resin can be manufactured not costly with the simple mold.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. An automotive lamp comprising:

a lamp body having a front opening;

a front lens coupled to said front opening of said lamp body;

a lamp chamber defined by said lamp body and said front lens;

a light source bulb installed within said lamp chamber; and an air communication mechanism comprising:
  an air communication hole formed in a rear wall of said lamp body;
  a cylinder member extending rearwardly from and integrally with an opening periphery of said air communication hole;
  a surrounding wall projecting from a rear wall of said lamp body for surrounding said cylinder member with a certain distance therefrom;
  a first water blocking wall projecting leftward from a lower distal end of a right side wall of said surrounding wall;
  a second water blocking wall projecting rightward from the left side wall of said surrounding wall at a position slightly upper than the lower distal end of the left side wall;
  a pent roof wall extending in the horizontal direction at a position slightly upper than said surrounding wall;
  a cover member formed integrally with said pent roof wall continuously therefrom through a thin hinge section, said cover member being provided at a tip end thereof with an engaging protrusion, said thin hinge section being formed on a surface of a junction of said pent roof wall and said cover member opposite said surrounding wall by forming a recess which is V-shaped in cross section;
  a couple of outside walls formed on the rear wall of said lamp body to extend in the vertical direction and spaced apart laterally From said surrounding wall;
  a step part facing rearward formed at a rear end of said respective outside walls on surfaces thereof facing each other, said step parts positioning on substantially the same plane as the rear end of said surrounding wall; and
  a stopper wall extending in the horizontal direction at a position slightly lower than said first water blocking wall, said stopper wall being formed with an engaging slit at a rear portion thereof.

2. The automotive lamp according to claim 1, wherein the projecting length of said surrounding wall is slightly longer than that of said cylinder member, the left end of the first water blocking wall does not reach a left side wall of said surrounding wall, a right distal end of said second water blocking wall does not reach the right side wall of said surrounding wall, said first and second water blocking walls are vertically spaced apart from each other, and the projecting length of each of said water blocking walls is substantially the same as that of said surrounding wall, the projecting length of said pent roof wall is substantially the same as that of said surrounding wall, and the projection length of said outside walls from the rear wall of said lamp body is slightly longer than that of said surrounding wall.

3. The automotive lamp according to claim 1, wherein an angle of said V-shaped recess is approximately 90°.

4. The automotive lamp according to claim 1, wherein a bottom of said recess has a curved surface.

5. The automotive lamp according to claim 1, wherein a thickness of said thin hinge section is within a range of 0.3 to 0.7 mm.

6. An air communication system comprising:
  an air communication hole formed in a rear wall of a lamp body;
  a cylinder member extending rearwardly from and integrally with an opening periphery of said air communication hole;
  a surrounding wall projecting from a rear wall of said lamp body for surrounding said cylinder member with a certain distance therefrom;
  a first water blocking wall projecting leftward from a lower distal end of a right side wall of said surrounding wall;
  a second water blocking wall projecting rightward from the left side wall of said surrounding wall at a position slightly upper than the lower distal end of the left side wall;
  a pent roof wall extending in the horizontal direction at a position slightly upper than said surrounding wall;
  a cover member formed integrally with said pent roof wall continuously therefrom through a thin hinge section, said cover member being provided at a tip end thereof with an engaging protrusion, said thin hinge section being formed on a surface of a junction of said pent roof wall and said cover member opposite said surrounding wall by Forming a recess which is V-shaped in cross section;
  a couple of outside walls formed on the rear wall of said lamp body to extend in the vertical direction and spaced apart laterally From said surrounding wall;
  a step part facing rearward formed at a rear end of said respective outside walls on surfaces thereof facing each other, said step parts positioning on substantially the same plane as the rear end of said surrounding wall; and
  a stopper wall extending in the horizontal direction at a position slightly lower than said first water blocking wall, said stopper wall being formed with an engaging slit at a rear portion thereof.

7. The air communication system according to claim 6, wherein the projecting length of said surrounding wall is slightly longer than that of said cylinder member, the left end of the first water blocking wall does not reach a left side wall of said surrounding wall, a right distal end of said second water blocking wall does not reach the right side wall of said surrounding wall, said first and second water blocking walls are vertically spaced apart from each other, and the projecting length of each of said water blocking walls is substantially the same as that of said surrounding wall, the projecting length of said pent roof wall is substantially the same as that of said surrounding wall, and the projection length of said outside walls from the rear wall of said lamp body is slightly longer than that of said surrounding wall.

8. The air communication system according to claim 6, wherein an angle of said V-shaped recess is approximately 90°.

9. The air communication system according to claim 6, wherein a bottom of said recess has a curved surface.

10. The air communication system according to claim 6, wherein a thickness of a thin hinge section is within a range of 0.3 to 0.7 mm.

* * * * *